(No Model.) 2 Sheets—Sheet 1.
T. J. SMITH.
PICKET FENCE MACHINE.
No. 418,990. Patented Jan. 7, 1890.
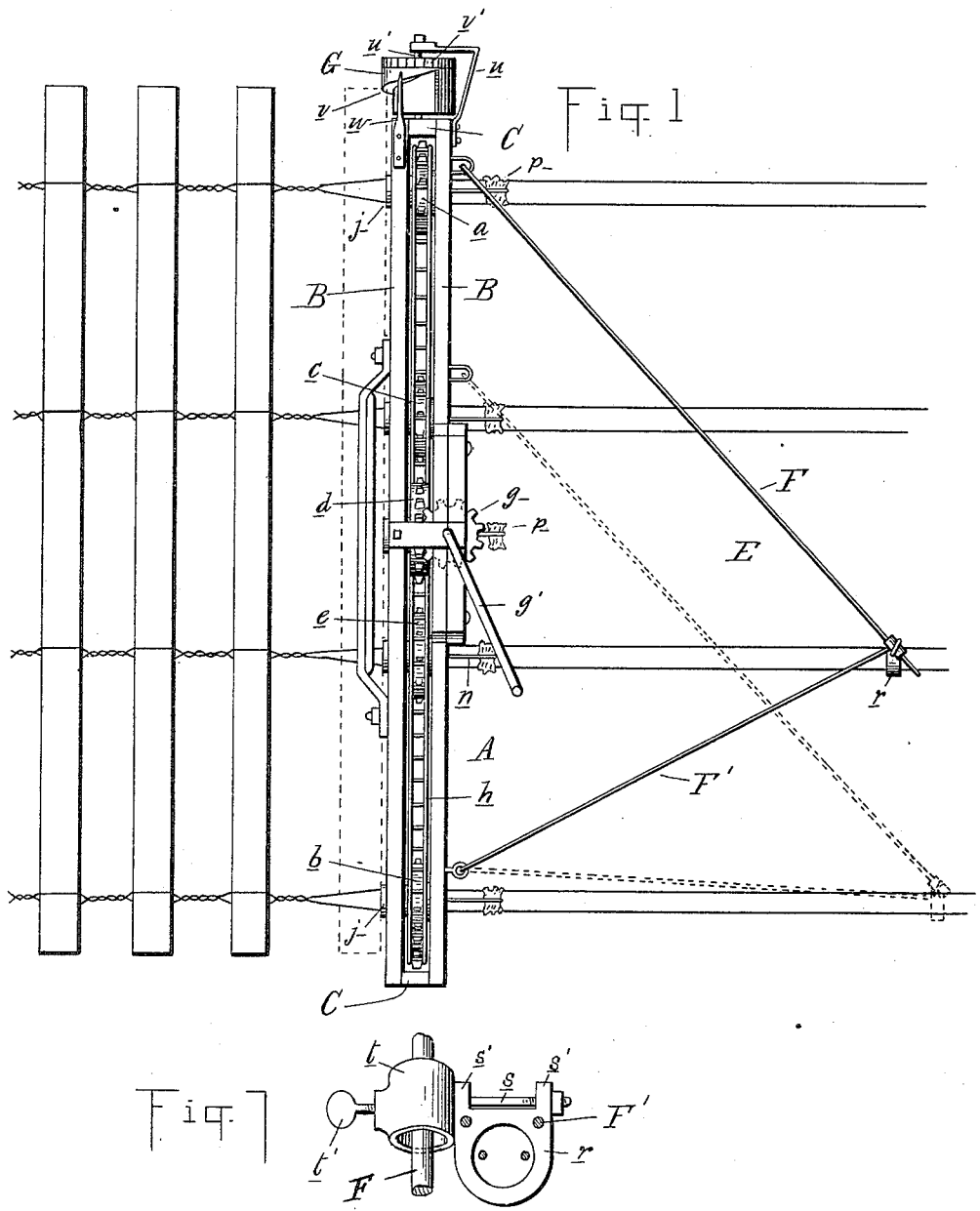
Witnesses:
P. M. Hulbert
E. McBrearty
Inventor:
Thomas J. Smith
By Thos. A. Sprague & Son
Atty.

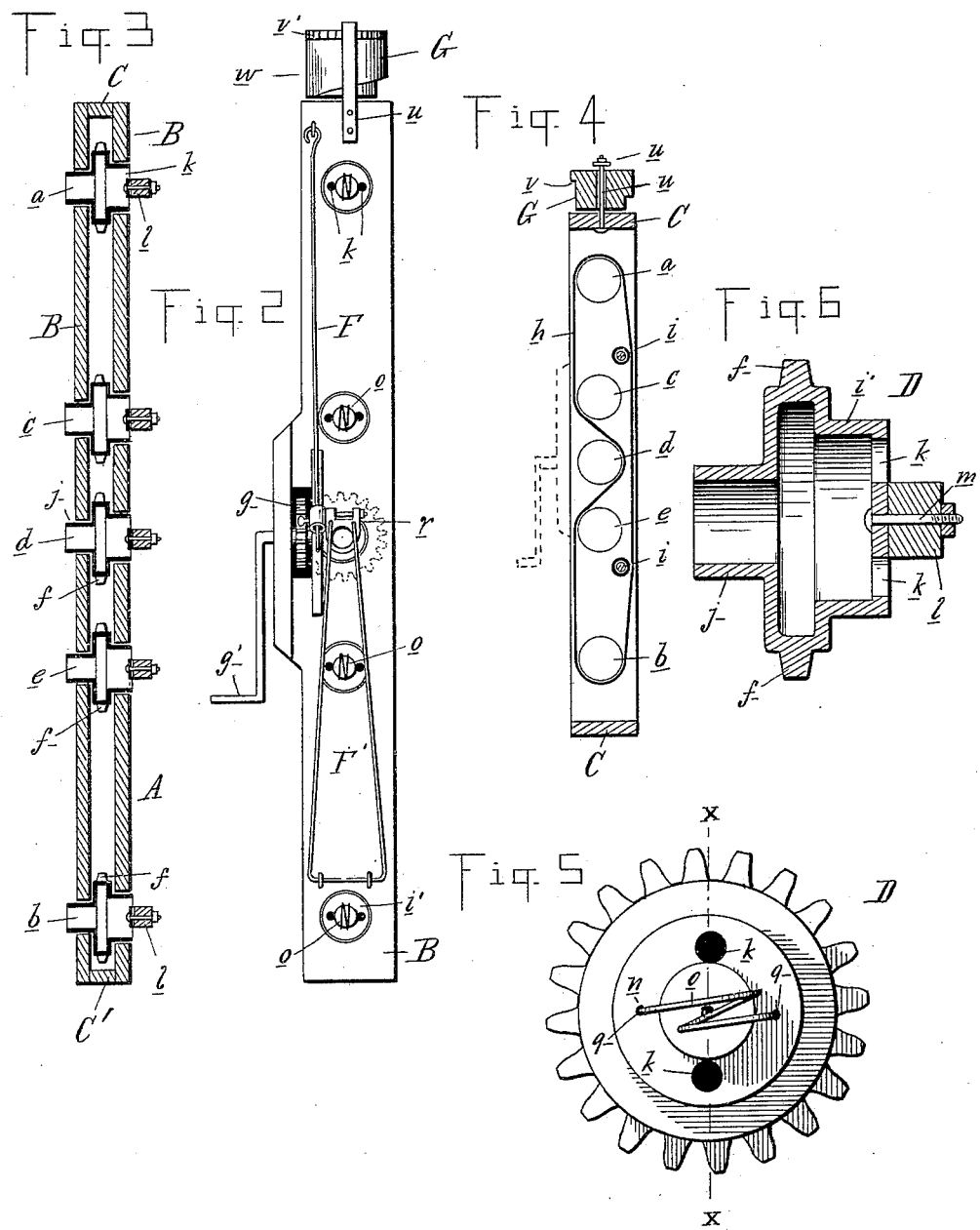

UNITED STATES PATENT OFFICE.

THOMAS J. SMITH, OF JACKSON, MICHIGAN.

PICKET-FENCE MACHINE.

SPECIFICATION forming part of Letters Patent No. 418,990, dated January 7, 1890.

Application filed June 12, 1889. Serial No. 313,998. (No model.)

*To all whom it may concern:*

Be it known that I, THOMAS J. SMITH, a citizen of the United States, residing at Jackson, in the county of Jackson and State of Michigan, have invented certain new and useful Improvements in Picket-Fence Machines, of which the following is a specification, reference being had therein to the accompanying drawings.

My invention relates to improvements in fence-machines, and has especial reference to a machine for making "picket fences;" and the object of the invention is the production of a machine which will produce such fences in a rapid and perfect manner, and which will possess merit in point of simplicity, durability, and inexpensiveness.

To attain the desired objects the invention consists in certain features of construction and combinations of parts, all as hereinafter described and specifically claimed.

In the drawings which accompany this specification, Figure 1 is a side elevation of my machine as in use. Fig. 2 is an end elevation at right angles to Fig. 1. Fig. 3 is a vertical central section through Fig. 2. Fig. 4 is a diagram vertical central section at right angles to Fig. 3. Fig. 5 is a plan view of one of the twister-wheels detached. Fig. 6 is a vertical central section on line $x\ x$ in Fig. 5, and Fig. 7 is a perspective view of the swivel-connection on the guide-arms.

A is a frame of rectangular shape, and consisting of the sides B and top and bottom C C'. In this frame are journaled in suitable apertures the twister-wheels D, which are arranged as shown in the drawings, wherein $a$ and $b$ are upper and lower wheels, and $c$, $d$, and $e$ are three central wheels. All of these wheels are provided upon their periphery with suitable teeth $f$.

A pinion $g$, provided with a crank-handle $g'$, engages with the wheel $d$, and power is transmitted to the other wheels by means of a sprocket-chain $h$, which passes around the wheel $d$, between the wheels $c$ and $e$, over the upper sprocket-wheel $a$, and below the lower wheel $b$. Suitable rollers or friction devices $i$ are arranged to prevent the chain from coming in contact in its downward course with the other wheels or chain. By this arrangement of wheels and chain I am enabled to the best advantage, with the smallest possible amount of gearing, to use my machine for twisting three or four strand fences, and to maintain a proportionate distance between the strands.

In constructing a four-strand fence I pass the wires through the wheels $a$, $c$, $e$, and $b$, these wheels being supported the same distance from each other. In building a three-strand fence I pass the wires through the wheels $a$, $d$, and $b$, these wheels also being equal distances apart.

I preferably construct my wheels as shown in Figs. 5 and 6, consisting of the body portion of cast-iron, having sprocket-teeth integral therewith, and with the hubs $i'$ and $j$ on opposite sides. The hub $i'$ is provided with the aperture $k$ for the passage of the wire, while the hub $j$ is hollow, leaving the wires free to twist therein. The hub $j$ is of suitable length to project slightly through the side of the frame and form a bumper in bringing the machine up to the picket. In order to prevent any danger of damage in this use I make the hub $i'$ of considerably larger diameter than the hub $j$. This construction also prevents the binding of the wire in the machine in bringing it up to the picket, although it will twist as tightly as in other constructions where the twisting-apertures are immediately opposite the picket.

$l$ is a friction or wearing block secured between the apertures $k$ by means of the bolt $m$, the office of this block being to take up the wear in the use of the machine, the block being turned around as a groove or notch is worn on one side.

$n$ is a spring-wire bent into a loop $o$, in which a suitable porous medium—such as sponge $p$—is secured, and the ends of the wire are engaged into suitable apertures $q$ in the face of the twister-wheel, as shown in Fig. 5.

It is evident that the sponge or porous medium, being of sufficient size to come in contact with the wires entering the aperture $k$ as the machine is moved along, will lubricate the wire and make the work much easier.

In order to support my machine more steadily upon the fence and to keep it in the proper relation to the wires in going up or down hill, I construct the guide-frame E, consisting of two bars F F', pivotally connected at the top and bottom, respectively, of the frame. The lower bar I preferably construct in the form of a loop, as shown in Fig. 2, to provide a better support. The bar F' carries at its outer end a ring r, having apertures, into which the ends of the bar F engage. A bolt s, passing through the lugs s', pivotally secures to the ring the sleeve t, which is provided with a thumb-screw t'. The upper guide-bar F is passed through the sleeve t after the ring r has been engaged upon one of the strands of the fence, as shown in Fig. 1, the set-screw holding it firmly in position. It is evident that from this construction the machine is prevented from tipping from a vertical position. At the same time the wires are free to twist in the ring r. It is also evident that by bringing the two arms of the guide in different angular relations to each other they may be engaged upon any desired strand—for instance, upon the lower strand, as shown in Fig. 1 in dotted lines—and in going up or down hill the guide may be set at the desired angle to keep the machine perpendicular, in order to strain the pickets in that position.

G is a wheel pivotally secured at the top of the machine, such as by the bracket u and bolt u'. On the side of this wheel is formed a spiral ledge v, and graduated marks v' are arranged around the top thereof.

w is a pointer secured to the side of the machine, and with its upper end extends in proximity to the marks v'.

In practice, this machine being strung upon the wires, the operator places a picket between the strands, turns the crank-handle g', thereby twisting the wires and securing the picket in position, withdraws the machine, and at the same time turns the wheel G the distance between two of the graduated marks, so as to bring a higher portion of the spiral toward the picket. The next picket is placed in position with its upper end abutting against the ledge v, the work being proceeded with in this manner until the middle point between two posts is reached, when, in placing each successive remaining picket in position, the wheel G is turned in the reverse direction. In this way the middle pickets are arranged in successively higher relation to the wires, so that when each section of the fence is completed the sag in the wires between the posts will be overcome and the tops of the pickets will be arranged on a level.

What I claim as my invention is—

1. In a picket-fence machine, the hereindescribed twister, consisting of the hollow body having sprocket-teeth, the hub on one side adapted to form a bumper, the hub on the opposite side having wire-passages, the rotatable bearing-block on said hub, and the wire secured to said hub for receiving a sponge or other porous article, substantially as and for the purpose described.

2. In a picket-fence machine, a twister-wheel consisting of a hollow body having sprocket-teeth integral therewith, hubs i' and j, the former having wire-passages k, the hub extending through the frame forming a bumper, and a rotatable bearing-block secured between the wire-passages, substantially as described.

3. In a picket-fence machine, the combination, with the frame carrying the twisters, of the bars having one of their ends connected to said frame, and the ring connected to said bars and having the sleeve, one of said bars being adjustable in said ring and the other in the sleeve, substantially as and for the purpose described.

4. In a picket-machine, a frame having twister-wheels journaled therein, and the wire loop o, secured to the twister-wheels, carrying the sponge j, having contact with the wires, adapted, when supplied with a lubricator, to oil the wires in advance of the machine, substantially as described.

5. In a picket-fence machine, a picket-leveling device consisting of a wheel pivotally secured to the frame and provided with a spiral ledge extending beyond the back of the machine, substantially as described.

6. In a picket-fence machine, the combination of the following elements: a frame, twister-wheels journaled therein, mechanism for rotating said twister-wheels, and an outrigger consisting of the bars F F', pivotally attached to the frame at their inner ends, the bar F' at its outer end engaged into the ring r, which has the sleeve t pivotally secured thereto, the outer bar F being adjustably secured in said sleeve, substantially as described.

In testimony whereof I affix my signature, in presence of two witnesses, this 25th day of March, 1889.

THOMAS J. SMITH.

Witnesses:
JAS. WHITTEMORE,
ALFRED B. EATON.